M. D. MILLER.
SIGNALING DEVICE.
APPLICATION FILED JULY 27, 1916.
1,249,451.
Patented Dec. 11, 1917.
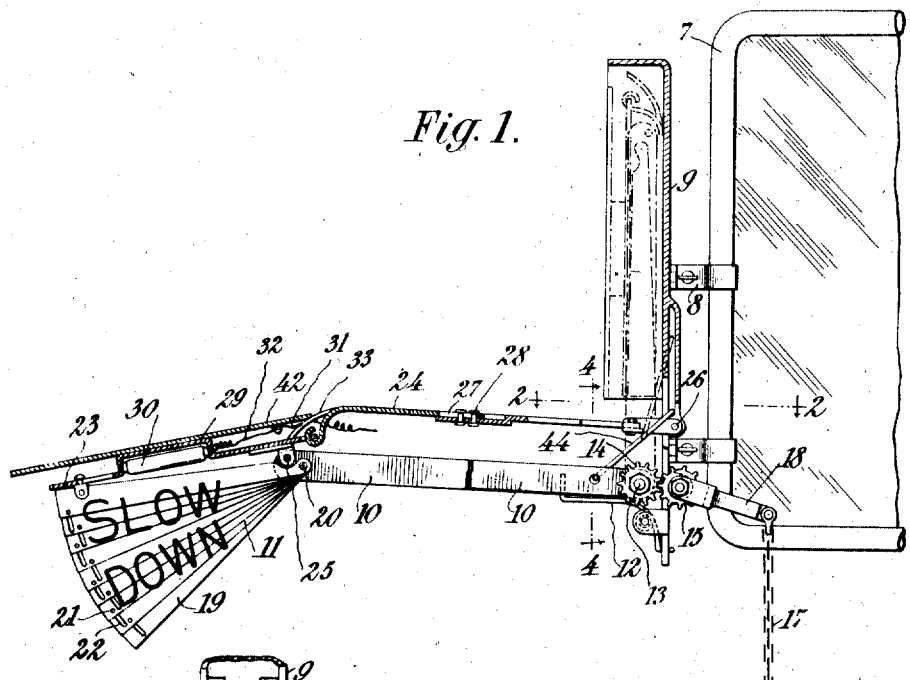
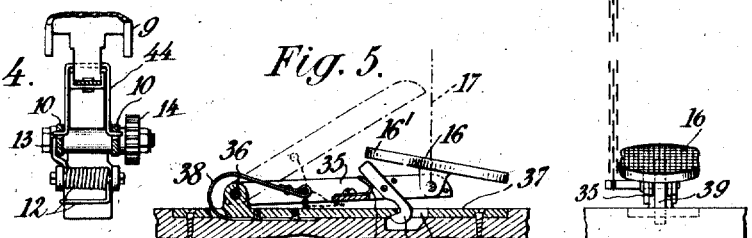
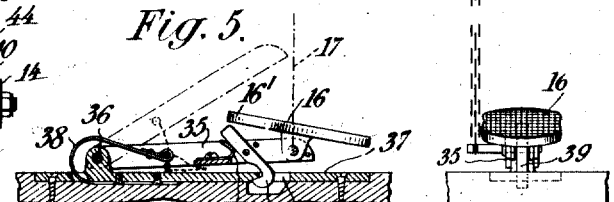
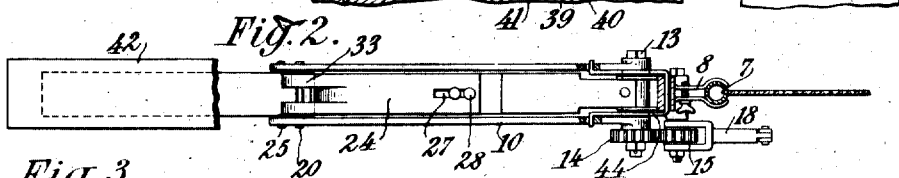
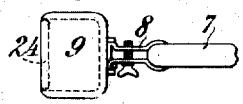
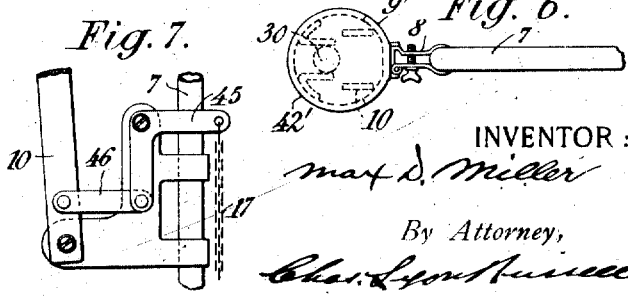
WITNESS:
René Buine
INVENTOR:
Max D. Miller
By Attorney,
Chas. Lyon

UNITED STATES PATENT OFFICE.

MAX D. MILLER, OF SCHENECTADY, NEW YORK.

SIGNALING DEVICE.

1,249,451.  Specification of Letters Patent.  Patented Dec. 11, 1917.

Application filed July 27, 1916. Serial No. 111,587.

*To all whom it may concern:*

Be it known that I, MAX D. MILLER, a subject of the Czar of Russia, residing at the city of Schenectady, county of Schenectady, and State of New York, have invented certain new and useful Improvements in Signaling Devices, of which the following is a specification.

This invention relates to semaphores or visual signals adapted to be carried by vehicles, such for instance as automobiles, and intended to serve as a means of communication between the occupant of such vehicle, as for instance the driver of the car carrying the signal, and some other person as for instance the driver of another car, particularly one approaching the rear of the signal-carrying car. Among the objects of the invention is to provide a normally folded and preferably housed signal device at all times under the control of the operator, the controlling parts being located conveniently for his actuation, preferably by a pedal arrangement. In the drawings accompanying this specification one practicable embodiment of the invention is illustrated. In such drawings—

Figure 1 is a rear elevation of the device partly shown in section and attached to the wind-shield of an automobile. The signal is shown in its extended or signaling position;

Fig. 2 is a plan or horizontal section taken at about the plane of the line 2—2 of Fig. 1;

Fig. 3 is a top plan view of the wind-shield and signal when in its normally idle or closed position;

Fig. 4 is a vertical section taken on about the plane of the line 4—4 in Fig. 1; and Fig. 5 is a longitudinal section of the pedal illustrated in Fig. 1 and shown at about right angles to the position illustrated in such figure.

Fig. 6 is top view of another form of housing and

Fig. 7 is a detail of another form of actuator connection.

For convenience of illustration the device is shown securely clamped to the frame 7 of an automobile wind-shield. The clamps are represented at 8 as connected to a supporting member 9 which, in the present instance, also serves as a housing for the parts when these are in their folded position. A signal arm 10, preferably formed of two parallel flat metal bars, is pivoted to the lower end of the support 9. The free end of this signal arm carries the signal 11, presently to be described. The construction is preferably such that the signal folds with the arm 10 when this is returned to its idle or normally housed position. A spring 12 is shown acting upon the lower portion of the arm 10 for turning this upon its pivot and raising it into an upright position within the housing.

An axle 13 constitutes a pivot for the signal arm 10 and is fast therewith. There is also fast upon such axle a toothed sector 14 which in the present illustration is shown in the form of a pinion. This is shown meshed with an actuating sector or pinion 15. The ratio of the radii of the toothed sectors determines the amount of movement of the signal or semaphore arm relatively to the pedal 16, which is connected by means of a chain 17 to an arm 18, fast with the sector 15, in the illustration the ratio is a one to one construction.

The signal 11 is shown constructed like an ordinary folding fan with a series of flat blades 19, adapted to fold together flatwise and when folded lie in the space between the two members constituting the arm 10. A pivot 20 is shown passing through such arm members and the fan blades. Adjacent blades are shown connected together for limiting the opening or spreading movement of the fan, which blades are each shown provided with a rivet 21 mounted in a slot 22 of the adjacent blade. A cautionary legend is preferably carried by the fan blades in such position that when the fan is spread out this legend will be displayed and generally in a position rearwardly of the vehicle carrying the signaling device. Such a legend in the words "Slow down" is illustrated in the present drawings. As an actuator for the signal, a fan lever 23 is shown pivoted to the end of the signal arm. The pivot is preferably located beyond the fan pivot 20 and somewhat above the same when the signal arm 10 assumes approximately a horizontal position. A link 24 is shown articulated to the end of the fan lever 23 at a point inwardly of the pivot for fulcrum 25 of such fan lever. The link is also articulated at 26 to the support 9 above the pivot 13 of the signal arm and preferably inwardly thereof. It will be readily understood that when the arm 10 is moved downwardly into an approximately horizontal position, the link 24 acting on the lever 23, will raise the fan blade to which it is attached and thereby cause the blades of the fan to spread out and display the signal.

To permit the parts to readily fold together, the link 24 is extensible and contractible, it being preferably made in two portions, one of which is shown provided with a slot 27, and the other with headed pins 28 mounted in such slot.

The lever 23 is shown provided with a bend 29 forming a recess for a lamp 30 adapted to illuminate the signal at night. The lamp is shown wired in such manner that a contact 31 from the light wire 32 engages a contact 33 carried by the link 24 upon the parts assuming substantially the display position.

The pedal illustrated herein for operating the device, comprises the foot-engaging portion 16 pivoted to a lever 35 which is pivoted at 36 to a plate 37 fastened to the floor of the car. A spring 38 is provided for normally raising the lever, the raised position being illustrated in dotted lines (Fig. 5.) The lever carries a pivoted hook 39 for entering a slot 40 in the plate 37 and holding the lever down when fully depressed, a spring 41 serving to hold the hook in engagement with the plate at the end of the slot. When it is desired to release the parts to the influence of the spring 12, the operator presses down on the front end 16' of the pedal 16 and causes this to press against the end of the hook and withdraw the hook 39 from engagement with the plate against the resistance of the spring 41, thereupon releasing the pedal to the action of its spring 38 permitting the arm 10 to respond to the action of its spring 12 and return the parts to their normally idle position.

The operation of the device is substantially as follows: Assuming the parts to be in the dotted line position of Fig. 1 with the plate 42 which is secured to the lever 23 cooperating with the member 9 in housing the operative parts of the device, and the driver of the car seeing the necessity of slowing down his car or indicating to some person behind that he proposes turning or slowing down, he will press upon the pedal 16 which, through the instrumentality of the toothed sectors 14, 15 will move the signal arm 10 against the action of the spring 12 and cause such arm to assume substantially a horizontal position. When such arm about reaches this position, it is stopped in its downward movement by means of the link 44, and the pins 28 reaching the limit of their movement stop the further extension of link 24, whereby this drawing upon the fan lever 23 causes this to open or spread out the fan with a quick movement, thereby displaying the legend carried upon the fan blades. Of course, the opening of the fan in the present illustration is by gravity when one of the end blades of the fan is raised into a substantially horizontal position. At the same time the parts are moved into their display position the electrical contacts connected with the lamp 30 are brought into position to close the lamp circuit, and if this circuit is connected with a source of electrical energy the lamp is lighted and illuminates the legend. The operator may, if he desires, permit the parts to immediately assume their closed or idle position by removing his foot from the pedal, or he may move the pedal up or down causing the fan to open and close for the purpose of attracting attention and at the same time cause the light to flash on and off. If however, the signal is to be displayed for some considerable time, or if the operator desires to display the signal and have his feet free for operating other parts of the automobile mechanism, he presses the pedal so that the forward end 16' is elevated and out of the range of the end of the hook 39 so that this may engage the plate 37 and hold the parts in their display position. When the operator then wishes to permit the signal to return to its normal position, he actuates the pedal as explained and releases the hook 39, whereupon the parts assume the dotted line position of Fig. 1, and the link 24 by its operation upon the fan lever 23 positively returns the fan and associated parts to their proper position. The weight of the fan assists this return movement which ordinarily might be effected by the gravity of the fan; but for securely holding the parts in their closed and housing position, the assistance of the link 24 is quite valuable. As before explained, the fan can be waved up and down, accompanied by an in and out folding and unfolding motion by a slight up and down movement of the pedal. This fan action further effectively attracts the attention of the driver of the car behind that carrying the signal and is particularly useful when immediate obedience to the signal is imperative.

When this semaphore comes into general use a code of signals will be adopted whereby drivers of cars by this means can greatly facilitate the proper movement of the vehicular traffic of crowded thoroughfares, and by coöperation with the police force materially reduce the inconvenience due to congestions and slowness of response to existing signals and also prevent injury to their own cars as also to those of others and to pedestrians generally.

The housing for the fan may in some instances be of tubular form or cylindrical, such form is illustrated in Fig. 6. The support 9' in the illustration constitutes a segment of about one quarter of the tube and its coöperative plate 42' when in folded position, completes the tube and forms a neat top finish for the fan when this is extended, it also in this position acts as a reflector for directing the light from the lamp upon both sides of the fan.

In practice it may be found desirable to substitute a bell crank lever 45 and link 46 for the toothed sectors, (see Fig. 7).

It is to be understood that the example of the invention shown in the drawings and particularly described herein is illustrative of the invention and that changes may be made within the scope of the claims without departing from the spirit of the invention.

What I claim is:

1. The combination with a support, of a signal arm pivoted thereto and comprising a pair of parallel members, a spring for moving the said arm into a position substantially parallel with the object to which the support is attached, a toothed sector fast with said arm, an actuator comprising a toothed sector meshing therewith, a pedal for operating said actuator, a signal comprising a series of blades folding together like a fan and pivoted to the free end of said arm and adapted to move between the said members thereof, a lever pivoted to said arms outwardly of the signal pivot and secured to one of the end blades of the series of blades, a link pivoted to the support, its pivot being located in such position that the link moves in substantial parallelism with the said arm, means for arresting the outward movement of the said arm and the outward movement of the said link, the said link upon being arrested being adapted to raise the fan end to which it is connected.

2. The combination with a support, of a signal arm pivoted thereto and comprising a pair of parallel members, a spring for moving the said arm into a position substantially parallel with the object to which the support is attached, a toothed sector fast with said arm, an actuator comprising a toothed sector meshing therewith, a pedal for operating said actuator, and comprising a lever connected to said actuator, a detent for holding said lever in its operative position, and a foot-piece pivoted to said lever and adapted for releasing the said lever, a signal comprising a series of blades folding together like a fan and pivoted to the free end of said arm and adapted to move between the said members thereof, a lever pivoted to said arms outwardly of the signal pivot and secured to one of the end blades of the series of blades, a link pivoted to the support, its pivot being located in such position that the link moves substantially in parallelism with the said arm, means for arresting the outward movement of the said arm and the outward movement of the said link, the said link upon being arrested being adapted to raise the fan end to which it is connected.

3. The combination with a folding signal and a lamp, of a tubular housing therefor, the tube being divided longitudinally into two unequal segments, the smaller of the segments comprising a support for the signal and being adapted to be connected to some portion of a vehicle, the larger segment being carried by the signal, the said larger segment carrying the lamp and serving as a reflector therefor.

In testimony whereof I have hereunto subscribed my name the 21st day of July, 1916.

MAX D. MILLER.